(12) United States Patent
Shi (10) Patent No.: US 9,541,918 B2
(45) Date of Patent: Jan. 10, 2017

(54) CLOUD NUMERICAL CONTROL SYSTEM

(71) Applicant: Yi Shi, Xi'an (CN)

(72) Inventor: Yi Shi, Xi'an (CN)

( * ) Notice: Subject to any disclaimer, the term of this patent is extended or adjusted under 35 U.S.C. 154(b) by 0 days.

(21) Appl. No.: 14/414,903

(22) PCT Filed: Jun. 8, 2013

(86) PCT No.: PCT/CN2013/000687
§ 371 (c)(1),
(2) Date: Jan. 15, 2015

(87) PCT Pub. No.: WO2014/012348
PCT Pub. Date: Jan. 23, 2014

(65) Prior Publication Data
US 2015/0185727 A1    Jul. 2, 2015

(30) Foreign Application Priority Data

Jul. 18, 2012   (CN) .......................... 2012 1 0249423

(51) Int. Cl.
*G05B 19/418*    (2006.01)
*G05B 19/414*    (2006.01)

(52) U.S. Cl.
CPC ......... *G05B 19/418* (2013.01); *G05B 19/4185* (2013.01); *G05B 19/4148* (2013.01); *G05B 2219/31001* (2013.01); *G05B 2219/31208* (2013.01); *G05B 2219/31241* (2013.01); *G05B 2219/31337* (2013.01);
(Continued)

(58) Field of Classification Search
CPC .............. G05B 19/418; G05B 19/4185; G05B 2219/31001; G05B 2219/31337; G05B 2219/32345; G05B 2219/31208; G05B 2219/31241; G05B 19/4148; Y02P 90/265; Y02P 90/26; Y02P 90/20; Y02P 90/14; Y02P 90/04; Y02P 90/18
See application file for complete search history.

(56) References Cited

U.S. PATENT DOCUMENTS 9,141,105 B2 *  9/2015  Trepina ................ G05B 19/406
2008/0105094 A1 *  5/2008  McMurtry ............. B23Q 15/12
                                                                    82/118

FOREIGN PATENT DOCUMENTS

CN    101118436 A    8/2002
CN    102455676 A    5/2012

OTHER PUBLICATIONS

Research on PC=I/O Open-Structure Multi-axis CNC System Based on General Industrial Multi Main-boards Parallel-Processing Technology by Yi Shi and Yuquen Wang, "Equipment Manufacture", vol. 9, No. 4, Nov. 2009, p. 44-51, published in China.

* cited by examiner

Primary Examiner — Nathan L Laughlin (57) ABSTRACT

The invention provides an implementing method of cloud numerical control system. The method implements a numerical control system with functions of online error compensation, CAD/CAPP/CAM/CNC integrating and interactively cooperative assembling machining control. The cloud numerical control system includes a small cloud numerical control system a large cloud numerical control system. The small cloud numerical control system focuses on inside control of a single numerical control machining device and includes a cloud control core node, cloud measure and control subnodes and fine-tuning driving units. The large cloud numerical control system is based on the small cloud numerical control system and performs interactively cooperative machining between multiple numerical control machining devices for different workpieces to be assembled.

5 Claims, 3 Drawing Sheets

(52) U.S. Cl.
CPC ..... *G05B 2219/32345* (2013.01); *Y02P 90/04* (2015.11); *Y02P 90/14* (2015.11); *Y02P 90/18* (2015.11); *Y02P 90/20* (2015.11); *Y02P 90/26* (2015.11); *Y02P 90/265* (2015.11)

CLOUD NUMERICAL CONTROL SYSTEM

BACKGROUND OF THE INVENTION

1. Technical Field

The invention relates to a numerical control method based on a "cloud calculation" mode and parallel processing of discrete network, belongs to fields of numerical control system, parallel information processing, network technology and industrial control, particularly related to numerical control machining, cooperative manufacture management, parallel control, remote measurement and control, troubleshooting treatment, communication network, automatic control and signal processing.

2. Related Art

The first generation of numerical control systems was established in 1952 with evacuated tubes. After that, the second generation was based on transistors, the third generation was based on integrated circuits, the fourth generation was based on small computers and the fifth generation was based on microcomputers. Currently, the sixth generation of numerical control systems is based on personal computers (PC). The PC numerical control is the most important improvement since the numerical control technology was established. In comparison with the fifth generation, the hardware platform and software platform of the PC numerical control are completely general. Although the fifth generation of numerical control systems is also known as "computer numerical control system", computers in such a system are of a proprietary type which must be developed and produced by the manufacturers of numerical control systems. Not only must the hardware systems be produced by the manufacturers of numerical control systems, but also fundamental software systems such as an operating system must be developed according to the hardware systems. Because the manufacturers of numerical control systems are not very skilled in development and production of computers, many problems occur, for example, the development period is too long, upgrade is too slow, performance is not good enough and manufacturing costs are too high. The sixth generation of numerical control systems based on general PCs completely overcomes those drawbacks so as to make the computer numerical control technology become faster and more reliable. A primary object of previous numerical control systems is motion control. Mainly controlled objects are electrical driving systems with multiple motion axles and a spindle. By the means of accepting commands of machining program design, simple or complicated motion control can be implemented so that numerical control machining is implemented, too.

In recent years, because the requirements of advanced manufacturing process keep higher and higher, pure motion control cannot satisfy the more complicated and accurate requirements of production. Such requirements of production include three aspects as follows:

a) A numerical control system must not only performs control and management of machining devices, but also be the online participates with management and cooperation in a company and between companies. Furthermore, a numerical control system must satisfy the integration requirement of CAD/CAPP/CAM functions. All of those requirements push the numerical control system to have stronger abilities of data processing, real-time control, discrete measurement and control, communication processing and parallel processing;

b) With higher and higher complicacy of numerical control machine-tools and other numerical machining devices, mere motion control is not enough, and more functional requirements are submitted, for example, various advanced combinative control functions in a complicated machining process (control and compensation functions of temperature, vibration, stress, tension and deformation), online automatic compensation function of abrasion of a cutter in a cutting process, online temperature compensation function of a machine-tools, online detection of various parameters of workpieces, complex machining combinative control function (such as drilling, grinding, scrolling and pressing), online simulation and verification of complicated machining, online monitor and troubleshooting treatment of numerical control machine-tools, online upgrade and technical support of numerical control systems, and so on;

c) With development of advanced manufacturing technology, from computer integrated manufacturing system to cooperative manufacturing systems between multiple companies, further to the "cloud manufacturing" provided in recent two years, all of those request numerical control systems to possess higher performance, i.e., a requirement of flexible cooperative manufacturing. Such a requirement of flexible cooperative manufacture pushes a numerical control machining device to be more intelligent.

To accomplish the above requirements, a numerical control system must have multiple functions of various motion control in a single device, combinative control, complex control, integration of CAD/CAPP/CAM, and cooperative control and match control with other devices.

SUMMARY OF THE INVENTION

The invention provides a cloud numerical control system for controlling a single numerical control machining device, characterized in that: the cloud numerical control system comprises a cloud control core node (CCCN), cloud measurement and control subnodes (CMCSNs), fine-tuning driving units (FTDUs), a real-time communication network (RTCN) and an online internet (OLI), wherein:

the CCCN performs a human-machine operation and host function, performs signal processing, combination control and operation of complex control algorithm and controls command output, remote communication and cooperative management operation functions, the CCCN includes a first PC subsystem, a second PC subsystem, a third PC subsystem and a fourth PC subsystem, the first, second, third and fourth PC subsystems perform host function, real-time control function, remote communication management function and redundancy control function, respectively;

the CMCSNs perform detection of operation status signals of components and generation of fine-tuning control signals, accept adjustment, management and control commands from the CCCN, a part of the CMCSNs associate with the CCCN to perform a real-time control function according to actual requirements, an organic contact is provided between the CMCSNs to implement a reasonable connection and an interactively cooperative measurement and control function;

the FTDUs accept commands of the CMCSNs to separately perform fine-tuning control operation to inside components of numerical control machining devices;

the RTCN performs online data transfer in the CCCN, between the CCCN and the CMCS and between the CMCSNs; and the OLI performs communication between the CCCN and an external device.

Furthermore, the first PC subsystem includes a human-machine interface/host processing/redundancy processing software module, a cooperative machining modification information processing software module, a machining path modification control software module, an interpolation control software module and a cloud measurement and control subnode feedback information processing software module, the first PC subsystem is an executor of a primary process of parallel processing of the CCCN and performs parallel processing and data exchange with the other PC subsystems;

the second PC subsystem includes a real-time machining path modification control software module, a cloud measurement and control subnode feedback information real-time processing software module, a fine-tuning control signal output software module, a real-time interpolation, cutter compensation, acceleration/deceleration processing, control output software and redundancy processing software module, the second PC subsystem is under control and management of the first PC subsystem;

the third PC subsystem includes a remote production management software module, a remote program design service software module, a remote technical service software module and a remote status monitor and troubleshooting treatment software module to perform remote production management, remote status monitor, troubleshooting treatment, remote program design and remote technical support and technical upgrade; and the fourth PC subsystem includes a real-time machining track modification control software module, a cloud measurement and control subnode feedback information real-time processing software module, a fine-tuning control signal output software module, a real-time interpolation, cutter compensation, acceleration/retardation processing, control output software and redundancy processing software module, the fourth PC subsystem is a redundant system of the second PC subsystem for replacing the second PC subsystem through management of the first PC subsystem to avoid machining discontinuation.

Furthermore, the CCCN further comprises an expandable fifth PC subsystem, the fifth PC subsystem includes a CAD software module, a CAPP software module and a CAM software for implementing integration of CAD, CAPP, CAM and CNC.

Furthermore, the CMCSNs further comprises a core controller and I/O modules with the function of independent measurement and control, the core controller possesses functions of acquiring detection signals from the I/O modules, retrieving compensation signals through signal processing and data integration processing, accepting feedback signals from other CMCSNs to further process, sending a processed result to the CCCN through a real-time bus communication, and accepting fine-tuning commands from the CCCN to process into a control command to a fine-tuning driving unit in a local numerical control machining device; each I/O module online acquires signals from the sensors, sends the signal to the core controller and accepts control commands of the core controller to send control output signals to the FTDUs, the CMCSNs exchange status information data to each other according to substantial connective relations and performs an independent modification control in the CMCSNs according to relative positions of each other and requirements of revised control, such a modification control is performed by sending commands to the FTDUs, and fine-tuning status information is feedbacked to the CCCN and other related CMCSNs for serving as feedback information of further modification.

The invention further provides a cloud numerical control system for cooperatively controlling multiple numerical control machining devices, characterized in that: the cloud numerical control system comprises a cooperative machining control subsystem (CMCS), a cloud control core node (CCCN), cloud measurement and control subnodes (CMCSNs), fine-tuning driving units (FTDUs), a real-time communication network (RTCN) and an online internet (OLI), wherein:

the CMCS accomplishes a function of interactively cooperative machining between different devices, functions of the CMCS include acquiring data of the finally machining errors of a work-piece in a previous machining step and providing the data to the CCCN, CMCSNs and FTDUs to make modification according to the actual machining accuracy, online acquiring various operational status parameters from the CCCN, CMCSNs, FTDUs, RTCN and OLI, integrating and analyzing data to obtain a real-time machining error of the work-piece which is being machined, predicting the sequent machining errors, sending the data to the multiple numerical control machining devices, receiving and analyzing corresponding data from the multiple numerical control machining devices to provide to a small cloud numerical control system to make modification, and sending the final errors of the work-piece to a cloud numerical control device of a numerical control machining device in the next machining step to optimize the next machining step after the work-piece has been machined;

the CCCN performs a human-machine operation and host function, performs signal processing, combination control and operation of complex control algorithm and controls command output, remote communication and cooperative management operation functions, the CCCN includes a first PC subsystem, a second PC subsystem, a third PC subsystem and a fourth PC subsystem, the first, second, third and fourth PC subsystems perform a host function, a real-time control function, a remote communication management function and a redundancy control function, respectively;

the CMCSNs perform detection of operation status signals of components and generation of fine-tuning control signals, accept adjustment, management and control commands from the CCCN, a part of the CMCSNs associate with the CCCN to perform a real-time control function according to actual requirements, an organic contact is provided between the CMCSNs to implement a reasonable connection and an interactively cooperative measurement and control function;

the FTDUs accept commands of the CMCSNs to separately perform fine-tuning control operation to inside components of numerical control machining devices;

the RTCN performs online data transfer in the CCCN, between the CCCN and the CMCSNs and between the CMCSNs; and the OLI performs communication between the CCCN and an external device.

Furthermore, the CMCS adopts an independent industrial PC system whose software module includes a remote communication software module, a data analysis and modification algorithm software module, a serial processing software module and a parallel processing software module, the remote communication software module is used for data exchange between numerical control systems of numerical control machining devices of serial machining and corresponding assembling machining, the data analysis and modification algorithm software module is used for analysis of machining path and modification processing according to data from the data exchange between numerical control systems of numerical control machining devices of serial machining and corresponding assembling machining and various machining parameters and status information from the CCCN, the CMCSNs, the FTDUs, the RTCN and the OLI, the serial processing software module and the parallel processing software module are used for independently processing results of the data analysis and modification algorithm software module to obtain the data format required by serial machining and parallel corresponding assembling machining, first sending to a cooperative machining modification information processing software module of a host subsystem of the CCCN to further execute a next job, sending back to the data analysis and modification algorithm software module to perform data exchange with numerical control systems of numerical control machining devices of serial machining and corresponding assembling machining through the remote communication software module.

Furthermore, the first PC subsystem includes a human-machine interface/host processing/redundancy processing software module, a cooperative machining modification information processing software module, a machining path modification control software module, an interpolation control software module and a cloud measurement and control subnode feedback information processing software module, the first PC subsystem is an executor of a primary process of parallel processing of the CCCN and performs parallel processing and data exchange with the other PC subsystems;

the second PC subsystem includes a real-time machining path modification control software module, a cloud measurement and control subnode feedback information real-time processing software module, a fine-tuning control signal output software module, a real-time interpolation, cutter compensation, acceleration/ deceleration processing, control output software and redundancy processing software module, the second PC subsystem is under control and management of the first PC subsystem;

the third PC subsystem includes a remote production management software module, a remote program design service software module, a remote technical service software module and a remote status monitor and troubleshooting treatment software module to perform remote production management, remote status monitor, troubleshooting treatment, remote program design and remote technical support and technical upgrade; and the fourth PC subsystem includes a real-time machining track modification control software module, a cloud measurement and control subnode feedback information real-time processing software module, a fine-tuning control signal output software module, a real-time interpolation, cutter compensation, acceleration/ deceleration processing, control output software and redundancy processing software module, the fourth PC subsystem is a redundant system of the second PC subsystem for replacing the second PC subsystem through management of the first PC subsystem to avoid machining discontinuation.

Furthermore, the CCCN further comprises an expandable fifth PC subsystem, the fifth PC subsystem includes a CAD software module, a CAPP software module and a CAM software for implementing integration of CAD, CAPP, CAM and CNC.

Furthermore, the CMCSNs further comprises a core controller and I/O modules with a function of independent measurement and control, the core controller possesses functions of acquiring detection signals from the I/O modules, retrieving compensation signals through signal processing and data integration processing, accepting feedback signals from other CMCSNs to further process, sending a processed result to the CCCN through a real-time bus communication, and accepting the fine-tuning commands from the CCCN to process into a control command to a fine-tuning driving unit in a local numerical control machining device; each I/O module online acquires signals from the sensors, sends the signal to the core controller and accepts control commands of the core controller to send control output signals to the FTDUs, the CMCSNs exchange status information data to each other according to substantial connective relations and performs an independent modification control in the CMCSNs according to relative positions of each other and requirements of exercise control, such a modification control is performed by sending commands to the FTDUs, and fine-tuning status information is feedbacked to the CCCN and other related CMCSNs for serving as feedback information of further modification.

DETAILED DESCRIPTION OF THE INVENTION

The invention provides a cloud numerical control system. There are two aspects in a cloud numerical system, the one is inside of a single device, and another one is between multiple cooperative machining devices. First, a single numerical control machining device serves as a subunit, all primary components in a subunit machining device except a numerical control system, such as electrical and mechanical components, machine base and machine table of a numerical control machining tools based on an embedded system, are equipped with a measurement and control unit and a fine-tuning unit to implement a "small cloud node" for obtaining online action status parameters of the independent components and online adjusting operation statuses of components. The motion status parameters of the components are feedbacked to a PC-based numerical control system with strong abilities of data processing to perform status analysis and dynamic feedback fine-tuning control for implementing a "small cloud numerical control" in a single device. Such a small cloud numerical control system has functions of integration of CAD/CAPP/CAM, remote communication and production management to improve performance of a single numerical control machining device. Second, in a machining process, various status parameters of the small cloud numerical control of a single device and a final size and error of work-piece are online obtained and sent to the next machining device with the small cloud numerical control through the cooperative communication network for optimizing the sequent machining step. Meanwhile, the above information is sent to independent small cloud numerical control of machining devices of other work-pieces to be assembled through the cooperative communication network for online adjusting machining errors of workpieces. This can implement a "large cloud numerical control".

1) Small Cloud Numerical Control System

The small cloud numerical control system is primarily composed of a cloud control core node (CCCN), cloud measurement and control subnodes (CMCS) and fine-tuning driving units (FTDUs), which are connected through a real-time communication network (RTCN), and the small cloud numerical control system uses an online internet (OLI) to connect external devices.

The CCCN performs a human-machine operation and host function, performs signal processing, combination control and operation of complex control algorithm and controls command output, remote communication, cooperative management operation functions and an integration function of CAD/CAPP/CAM. The CMCSNs perform detection of inner operation status signals of components and generation of fine-tuning control signals, and accept adjustment, management and control commands from the CCCN. A part of the CMCSNs associate with the CCCN to perform a real-time control function according to actual requirements. An organic contact is provided between the CMCSNs to implement a reasonable connection and an interactively cooperative measurement and control function. The FTDUs accept commands of the CMCSNs to separately perform fine-tuning control operation to inside components of numerical control machining devices. The RTCN performs online data transfer in the CCCN, between the CCCN and the CMCSNs and between the CMCSNs. The OLI performs communication between the CCCN and an external device.

a) The CCCN

The CCCN is based on an open and softwared PC+I/O structure to perform strong abilities of calculation, communication and expansibility. A fundamental structure of the CCCN includes four sets of independent industrial PC subsystem with ability of expanding more independent PC systems. The four sets of independent industrial PC subsystems perform a host function, a real-time control function, a remote communication management function and a redundancy control function, respectively, between which a real-time communication bus is connected to from a parallel processing mode to perform functions of multiplex program compiling, multi-axle motion path interpolation, cutter compensation control, acceleration/ deceleration control, integrated compensation control of machining error, complex control and remote machining management. An integration function of CAD/CAPP/CAM can be added by expanding a fifth industrial PC subsystem and more functions, such as online detection of size and accuracy and 3D reversing, can be further added by expanding other industrial PC subsystems.

The first set of industrial PC subsystem (subsystem 1) performs functions of human-machine interface, numerical control machining program compiling, numerical control machining code detection and simulation verification, system software/hardware self-configuring arrangement and external expanding interface, real-time bus communication (with other subsystems in the CCCN), complicated signal processing/combinative control/complex control algorithm operation, and remote system management/adjustment/cooperation. It may adopt the PCI, PCIE, ISA, Compact-PCI, PXI and/or VXI bus to implement various functions with respective add-on cards. Software of this subsystem includes a human-machine interface/host processing/redundancy processing software module, a cooperative machining modification information processing software module, a machining path modification control software module, an interpolation control software module and a cloud measurement and control subnode feedback information processing software module. This subsystem is an executor of a primary process of parallel processing of the CCCN and performs parallel processing and data exchange with the other PC subsystems.

The second set of industrial PC subsystem (subsystem 2) performs functions of multi-axle motion path interpolation, cutter compensation control, acceleration/ deceleration control, integrated compensation control of machining error (associating with the CMCSNs), complex control (associating with the CMCSNs) and real-time bus communication (associating with the other subsystems in the CCCN and the CCCN). It may adopt the PCI, PCIE, ISA, Compact-PCI, PXI and/or VXI bus. To implement functions of control of the direct driving units and the real-time bus driving units, various add-on cards and multi-functional I/O cards corresponding to the respective buses are used. Software of this subsystem includes a real-time machining path modification control software module, a CMCSNs feedback information real-time processing software module, a fine-tuning control signal output software module, a real-time interpolation, cutter compensation, acceleration/deceleration processing and control output software module and a redundancy processing software module. This subsystem is under management and control of the subsystem 1 and parallelly works with the subsystem 1.

The third set of industrial PC subsystem (subsystem 3) performs functions of remote production management, remote status monitor and troubleshooting judgment, remote program design and remote technical support and technical upgrade to implement various services from a remote service center. Software of this subsystem includes a remote production management software module, a remote program design service software module, a remote technical service software module and a remote status monitor and troubleshooting treatment software module. This subsystem can perform parallel processing with the subsystems 1, 2 and 4 and expanding subsystem 5 to implement the remote service at other subsystems.

The fourth set of industrial PC subsystem with redundancy control primarily serves as a redundant system of the subsystem 2 for replacing the subsystem 2 through management of the subsystem 1 to avoid machining discontinuation. Hardware of this subsystem is the same as that of the subsystem 2.

The fifth set of industrial PC subsystem (expanding subsystem 5) executes CAD/CAPP/CAM software and includes a CAD software module, a CAPP software module and a CAM software for implementing integration of CAD, CAPP, CAM and CNC.

b) The CMCSNs

The CMCSNs are installed in a numerical control machining bed and components of a numerical control machining device to perform dynamic online detection of signals including displacement, speed, acceleration, vibration, shock, temperature, voltage, current, torque, deformation and stress. The sensors used by the CMCSNs are composed of electricity, magnetism, optics, stress, flow and voltage. The compensation signals are fed back to the CCCN to form a large closed-loop compensation control. Fine-tuning driving control between subnodes may also be implemented by cross-coupling control. A part of the CMCSNs associate with the CCCN to perform a real-time control function according to actual requirements, for example, the CMCSNs of electrical output of multiple action axles may adopt a manner of accepting commands of the CCCN to perform electrical driving output and optimize the electrical driving parameters.

Because the CMCSNs are installed in a numerical control machining bed and components of a numerical control machining device, they must have features of compact volume, easy installation, high reliability and smart real-time communication and must be implemented by the embedded system with the modularized structure. In other words, a core controller and I/O modules with an independent measurement and control function are used to implement. And the type and quantity of the I/O modules can be adjusted according to different requirements.

The core controller of the CMCSNs possesses functions of acquiring detection signals from the I/O modules, retrieving compensation signals through signal processing and data integration processing, accepting feedback signals from other CMCSNs to further process, sending a processed result to the CCCN through a real-time bus communication, and accepting a fine-tuning command from the CCCN to process into a control command to a fine-tuning driving unit in a local numerical control machining device; each I/O module online acquires signals from the sensors, sends the signal to the core controller and accepts control commands of the core controller to send the control output signals to the FTDUs. The CMCSNs exchange status information data to each other according to substantial connective relations and performs an independent modification control in the CMCSNs according to relative positions of each other and requirements of exercise control, such the modification control is performed by sending commands to the FTDUs, and fine-tuning status information is fed back to the CCCN and other related CMCSNs for serving as feedback information of further modification.

The I/O modules of the CMCSNs primarily perform dynamic online detection of signals from sensors of electricity, magnetism, optics, stress, flow and voltage, the signals include displacement, speed, acceleration, vibration, shock, temperature, voltage, current, torque, deformation and stress and are sent to the core controller of the CMCSNs. The I/O modules accept control commands of the core controller of the CMCSNs to send a control output signal to the FTDUs.

Software of the CMCSNs includes a status test software module, a fine-tuning control software module and a cross-coupling control software module.

c) The FTDUs

The FTDUs of the CMCSNs accept control output signals of the CMCSNs to perform fine-tuning control operation to inside components of numerical control machining devices (for example, automatic bachlash compensation driving, automatic weighting adjustment and temperature adjustment driving), optimization of operation parameters of electrical components and optimization of motion path fine-tuning.

Action modes adopted by the FTDUs include a motion driving mode, a temperature adjustment mode, an electric parameter optimization and a motion path fine-tuning driving. They adopt electric components, mechanical components, cooling/heating components and micro components.

To implement the small cloud numerical control system, ability of design and manufacture of numerical control machining devices is required because the CMCSNs change the structure of traditional numerical control machining devices from an integration manner to a modularization manner. This implants a measurement and control unit with electric regulation and feedback control in a traditional component and adds activity into a numerical control machining device. Thus variability and performance of numerical control machining devices can be further improved.

A key to the small cloud numerical control system is to adopt a PC numerical control system of open and softwared industrial PC with parallel processing to serve as a core node. Adding more embedded system subnodes forms a new "cloud calculation" and "cloud control" structure. Furthermore, adding a dynamic detection and fine-tuning unit into a machining device completely change the structure of traditional numerical control systems.

2) The large cloud numerical control system

In comparison with the small cloud numerical control system which provides integrated control to a single numerical control machining device, the large cloud numerical control system focuses on cooperative machining control between independent numerical control machining devices in virtual dynamic united companies with a cloud manufacture mode.

In a traditional production process, an integral component needs multiple independent machining and final assembling. Each part is machined according to a size and tolerance demanded by original design. A part passing the demand of size and tolerance will become a qualified matter to be assembled with other parts. However, the tolerance is a range with uncertainty. As an example, a hole and shaft, suppose size tolerances of the shaft and hole are $\phi 100\ _0^{+0.02}$ and $\phi 100\ _0^{+0.001}$, respectively, and sizes of a finished shaft and hole are $\phi 100$ and $\phi 100.01$, respectively. Such assembling forms a gap match. However, sizes of another shaft and hole are $\phi 100.01$ and $\phi 100$. Such assembling forms an over-size match. A difference between these two sets of shafts and holes is obvious in practice. In actual machining production, the more complicated the part assembling is, the more frequently such a problem occurs. Thus, a situation frequently occurs, a part is not OK and another one is OK, but the previously unavailable one can be assembled with other parts. Such uncertainty is adverse to the quality and efficiency of assembling. Recently, the requirement of high accuracy becomes higher and higher, but high accuracy will increase the costs. Satisfying the requirement of high accuracy and low cost is a very difficult problem. These relate to many factors in an actual machining process. However, the key point is that the different parts are independently machined. Thus this causes such uncertainty.

To solve this problem, the invention provides a large cloud numerical control system, which uses the small cloud numerical control system with a dynamic online monitor function to online and real-time send both dynamic machining parameters and errors of a part to another numerical control machining device which is machining another part to be assembled with each other or to a numerical control machining device in a next machining step. This implements a new production mode 'interactive cooperative machining', which may be also called 'virtual assembling online machining mode'.

The large cloud numerical control system must be based on the small cloud numerical control system. Because the small cloud numerical control system adopts an open softwared industrial PC with parallel processing to serve as a core node, it is easy to expand to be an independent industrial PC to perform remote mutually-cooperative machining to implement a cooperative machining control subsystem. Also, such a cooperative machining control subsystem parallelly works and exchanges data with other industrial PCs to further guarantee availability of implement of "interactive cooperative machining".

Primary functions of the large cloud numerical control system include acquiring data of a finally machining error of a work-piece in a previous machining step and providing the data to the small cloud numerical control system to make modification according to the actual machining accuracy. In a machining process, the large cloud numerical control system online acquires various operational status parameters from the small cloud numerical control system, integrates and analyzes data to obtain a real-time machining error of the workpiece which is being machined, predicts a sequent machining error, sends the data to the multiple numerical control machining devices, receives and analyzes corresponding data from the multiple numerical control machining devices to provide to a small cloud numerical control system to make modification, and sends the final errors of the work-piece to a cloud numerical control device of a numerical control machining device in the next machining step to optimize the next machining step after the workpiece has been machined.

The large cloud numerical control system is based on the small cloud numerical control system and adds an independent industrial PC system (cooperative machining control subsystem 6). And communication of the system is based on the real-time communication network and remote internet.

Software of the cooperative machining control subsystem includes a remote communication software module, a data analysis and modification algorithm software module, a serial processing software module and a parallel processing software module.

The remote communication software module is used for data exchange between numerical control systems of numerical control machining devices of serial machining and corresponding assembling machining.

The data analysis and modification algorithm software module is used for analysis of machining track and modification processing according to data from the data exchange between numerical control systems of numerical control machining devices of serial machining and corresponding assembling machining and various machining parameters and status information from the small cloud numerical control system.

The serial processing software module and the parallel processing software module are used for independently processing results of the data analysis and modification algorithm software module to obtain a data format required by serial machining and parallel corresponding assembling machining, first sending to a cooperative machining modification information processing software module of a host subsystem of the small cloud numerical control system to further execute a next job, sending back to the data analysis and modification algorithm software module to perform data exchange with numerical control systems of numerical control machining devices of serial machining and corresponding assembling machining through the remote communication software module.

The key to the large cloud numerical control system is to use the small cloud numerical control system to obtain its dynamic machining information to obtain an actual machining error of a part through a method of data integration, and to predict a next possible error of another part machining to immediately adjust the small cloud numerical control system itself and feedback information to the other side to promote the other side to further adjust its machining process.

Also, the large cloud numerical control system must adopt cross-coupling, self-learning and synchronous control algorithms to implement an interactive control function. This guarantees multiple dynamic optimization and improvement of a machining process to finally achieve a result of "optimization in all aspects".

The large cloud numerical control system can overcome the problem of a part match error resulting from various factors and avoid the problems of an assembling accuracy error, long repair period, retuning repair and second machining, which result from "back-to-back machining".

The large cloud numerical control system exceeds a traditional numerical control system to enter a range of quality assurance system in a "cloud manufacturing" mode. It provides a strong fundament of level of production devices to the cloud manufacturing.

Such a "cloud numerical control system" not only performs quality control between production devices in a single company, but organically integrates quality control of production devices in a virtual dynamic united company in the modes of intelligent manufacturing and cloud manufacturing. It effectively enhances machining accuracy of machined parts and overall assembling accuracy between different parts through discrete "cloud calculation" and online error delivery. It provides a new and effective solution to the complex error resulting from environmental factors, machining art, accuracy of a single device, installation accuracy and cutter accuracy to avoid the problems of an assembling accuracy error, long repairing period, retuning repair and second machining, which result from "back-to-back machining". It implements an interactive cooperative machining mode between multiple independent machining devices, performs adjustment of production management and improves the quality of completely cooperative machining.

The cloud numerical control system is divided into a small cloud numerical control system and a large numerical control system, which are introduced as follows.

1) Small Cloud Numerical Control System

The small cloud numerical control system is primarily composed of a cloud control core node (CCCN), cloud measurement and control subnodes (CMCS) and fine-tuning driving units (FTDUs) and primarily performs a control function to a single numerical control machining device. The CCCN performs a human-machine operation and host function, performs signal processing, combination control and operation of complex control algorithm and controls command output, remote communication, cooperative management operation functions and an integration function of CAD/CAPP/CAM. The CMCSNs perform detection of inner operation status signals of components and generation of fine-tuning control signals, and accept adjustment, management and control commands from the CCCN. A part of the CMCSNs associate with the CCCN to perform a real-time control function according to actual requirements. An organic contact is provided between the CMCSNs to implement a reasonable connection and an interactively cooperative measurement and control function. The FTDUs accept commands of the CMCSNs to separately perform fine-tuning control operation to inside components of numerical control machining devices. The RTCN performs online data transfer in the CCCN, between the CCCN and the CMCSNs and between the CMCSNs. The OLI performs communication between the CCCN and an external device.

a) The CCCN

The CCCN is based on an open and softwared PC+I/O structure to perform strong abilities of calculation, communication and expansibility. A fundamental structure of the CCCN includes four sets of independent industrial PC subsystem with ability of expanding more independent PC systems. The four sets of independent industrial PC subsystems perform a host function, a real-time control function, a remote communication management function and a redundancy control function, respectively, between which a real-time communication bus is connected to from a parallel processing mode to perform functions of multiplex program compiling, multi-axle motion path interpolation, cutter compensation control, acceleration/ deceleration control, integrated compensation control of machining error, complex control and remote machining management. An integration function of CAD/CAPP/CAM can be added by expanding a fifth industrial PC subsystem and more functions, such as online detection of size and accuracy and 3D reversing, can be further added by expanding other industrial PC subsystems.

Figure 1:
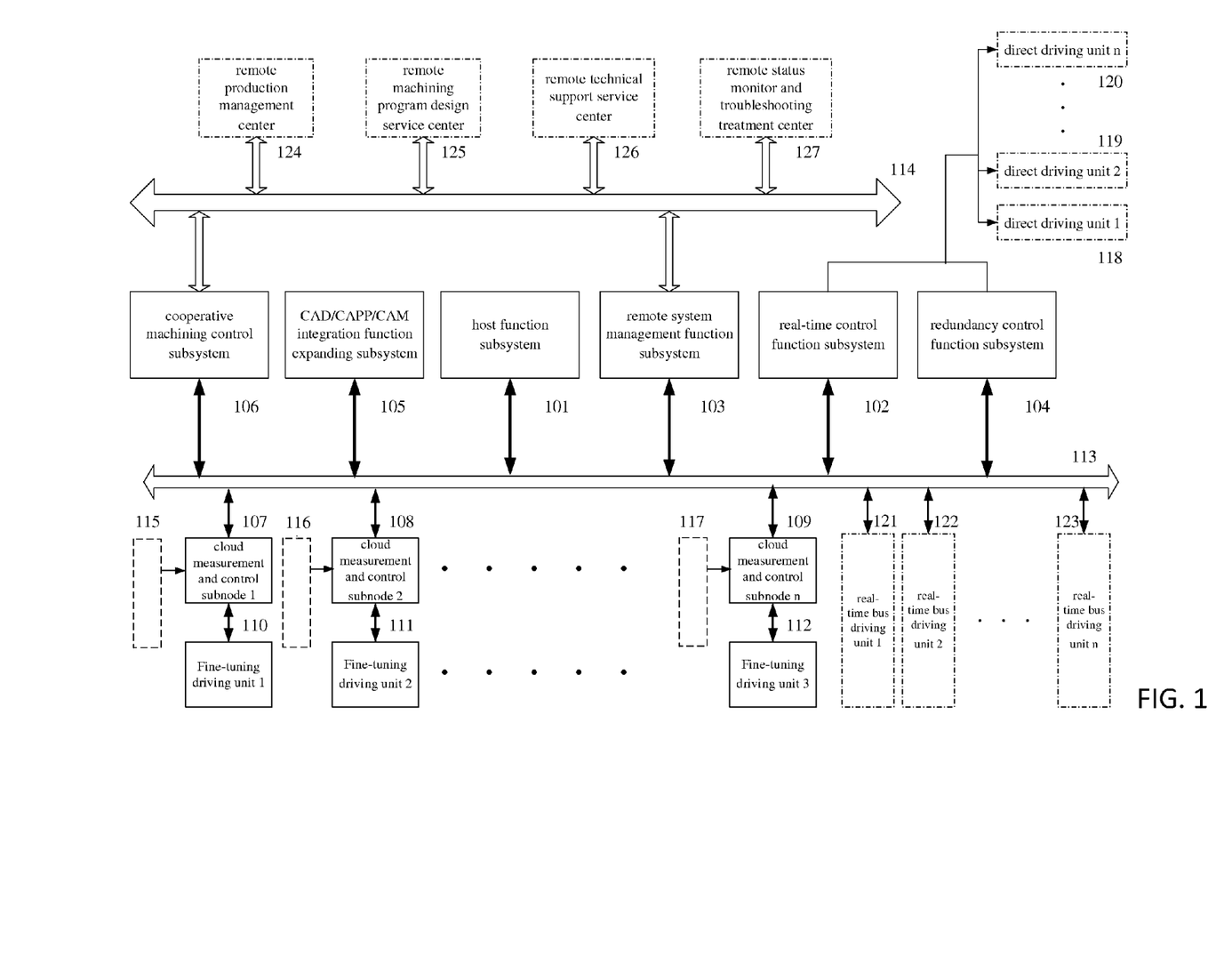
FIG. 1 shows a systematic structure of the cloud numerical control system of the invention.

In FIG. 1, the CCCN of the small cloud numerical control system includes reference numerals 101, 102, 103, 104, 105, 113 and 114.

Reference numerical 101 is a host function subsystem, whose functions include human-machine interface, numerical control machining program compiling, numerical control machining code detection and simulation verification, system software/hardware self-configuring arrangement and external expanding interface, real-time bus communication (with other subsystems in the CCCN), complicated signal processing/combinative control/complex control algorithm operation, and remote system management/adjustment/cooperation. It may adopt the PCI, PCIE, ISA, Compact-PCI, PXI and/or VXI bus to implement various functions with respective add-on cards. Software of this subsystem includes a human-machine interface/host processing/redundancy processing software module, a cooperative machining modification information processing software module, a machining path modification control software module, an interpolation control software module and a cloud measurement and control subnode feedback information processing software module. This subsystem is an executor of a primary process of parallel processing of the CCCN and performs parallel processing and data exchange with the other PC subsystems.

Reference numerical 102 is a real-time control function subsystem, whose functions include multi-axle motion path interpolation, cutter compensation control, acceleration/deceleration control, integrated compensation control of machining error (with the CMCSNs), complex control (with the CMCSNs) and real-time bus communication (with other subsystems in the CCCN and associating with the CMCSNs). It may adopt the PCI, PCIE, ISA, Compact-PCI, PXI and/or VXI bus. To implement functions of control of the direct driving units 118, 119, 120 and the real-time bus driving units 121, 122, 123, various add-on cards and multi-functional I/O cards corresponding to the respective buses are used. Software of this subsystem includes a real-time machining path modification control software module, a CMCSNs feedback information real-time processing software module, a fine-tuning control signal output software module, a real-time interpolation, cutter compensation, acceleration/deceleration processing and control output software module and a redundancy processing software module. This subsystem is under management and control of the subsystem 1 and parallelly works with the subsystem 101.

Reference numerical 103 is a remote system management function subsystem, whose functions include remote production management, remote status monitor and troubleshooting judgment, remote program design and remote technical support and technical upgrade to implement various services from a remote service center. Software of this subsystem includes a remote production management software module, a remote program design service software module, a remote technical service software module and a remote status monitor and troubleshooting treatment software module. This subsystem can perform parallel processing with the subsystems 101, 102, 104 and expanding subsystem 105 to implement the remote service at other subsystems.

Reference numerical 104 is a redundancy control function subsystem, which primarily serves as a redundant system of the subsystem 102 for replacing the subsystem 102 through management of the subsystem 101 to avoid machining discontinuation. Hardware of this subsystem is the same as that of the subsystem 102.

Reference numerical 105 is an industrial PC subsystem performing an integrating function of CAD/CAPP/CAM. It primarily executes CAD/CAPP/CAM software and includes a CAD software module, a CAPP software module and a CAM software for implementing integration of CAD, CAPP, CAM and CNC.

Reference numerical 113 is a real-time communication data link and adopts the real-time communication bus to connect between the CCCNs 101-105 and between the CMCSNs and cooperative machining control subsystems to implement a real-time communication function.

Reference numerical 114 is a remote communication data link and adopts a wired or wireless internet to implement a remote communication function between remote service centers 124 (remote production management center), 125 (remote machining program design service center), 126 (remote technical support service center), 127 (remote status monitor and troubleshooting treatment center), and between the cooperative machining control subsystem 106 and other cloud numerical control systems cooperating therewith.

Reference numerical 124 is a remote production management center, which sends management commands to subsystem 103 according to an actual requirement of the management center to implement remote machining management.

Reference numerical 125 is a remote machining program design service center. It sends a customized machining program according to a user's actual requirements to subsystem 103, then the subsystem 103 transfers to the subsystem 101 to implement a machining program design service to a specific workpiece.

Reference numerical 126 is a remote technical support service center, which provides various support services and technical upgrade according to the user's requirements.

Reference numerical 127 is a remote status monitor and troubleshooting treatment center, which performs status monitor and troubleshooting treatment of machining devices according to subsystems 101, 102 and CMCSNs to implement remote status monitor and troubleshooting treatment, analysis and processing.

2) The CMCSNs

The CMCSNs are installed in a numerical control machining bed and components of a numerical control machining device to perform dynamic online detection of signals including displacement, speed, acceleration, vibration, shock, temperature, voltage, current, torque, deformation and stress. The sensors used by the CMCSNs are composed of electricity, magnetism, optics, stress, flow and voltage. A compensation signal is fed back to the CCCN to form a large closed-loop compensation control. Fine-tuning driving control between subnodes may also be implemented by cross-coupling control. A part of the CMCSNs associate with the CCCN to perform a real-time control function according to actual requirements, for example, the CMCSNs of electrical output of multiple action axles may adopt a manner of accepting commands of the CCCN to perform electrical driving output and optimize the electrical driving parameters.

In FIG. 1, reference numerals 107, 108 and 109 separately stand for CMCSNs installed in different numerical control machining devices. Reference numerals 115, 116 and 117 stand for sensor sets cooperating with CMCSNs.

The CMCSNs are composed of a core controller and I/O modules with a function of independent measurement and control. The type and quantity of the I/O modules can be adjusted according to different requirements to implement functions of online status monitor and control of the FTDUs. Each I/O module online acquires signals from a sensor, sends the signal to the core controller and accepts control commands of the core controller to send a control output signal to the FTDUs, the CMCSNs exchange status information data to each other according to substantial connective relations and performs an independent modification control in the CMCSNs according to relative positions of each other and requirements of exercise control, such a modification control is performed by sending commands to the FTDUs, and fine-tuning status information is feedbacked to the CCCN and other related CMCSNs for serving as feedback information of further modification.

3) The FTDUs

The FTDUs of the CMCSNs accept control output signals of the CMCSNs to perform fine-tuning control operation to inside components of numerical control machining devices (for example, automatic backlash compensation driving, automatic weighting adjustment and temperature adjustment driving), optimization of operation parameters of electrical components and optimization of action track fine-tuning. In FIG. 1, reference numerals 110, 111 and 112 separately stand for FTDUs installed in components of different numerical control machining devices and cooperated with the CMCSNs.

2. Large Cloud Numerical Control System

The large cloud numerical control system accomplishes a function of interactively cooperative machining between different devices. Functions of the large cloud numerical control system include acquiring data of a finally machining error of a workpiece in a previous machining step and providing the data to the small cloud numerical control system to make modification according to an actual machining accuracy, online acquiring various operational status parameters from the samll cloud numerical control system, integrating and analyzing data to obtain a real-time machining error of the workpiece which is being machined, predicting a sequent machining error, sending the data to the multiple numerical control machining devices, receiving and analyzing corresponding data from the multiple numerical control machining devices to provide to a small cloud numerical control system to make modification, and sending the final error of the workpiece to a cloud numerical control device of a numerical control machining device in a next machining step to optimize the next machining step after the workpiece has been machined.

The large cloud numerical control system is based on the small cloud numerical control system and adds an independent industrial PC system (cooperative machining control subsystem 6). And communication of the system is based on the real-time communication network and remote internet. In FIG. 1, reference numeral 106 stands for the large cloud numerical control system.

Software of the CMCS includes a remote communication software module, a data analysis and modification algorithm software module, a serial processing software module and a parallel processing software module.

The remote communication software module is used for data exchange between numerical control systems of numerical control machining devices of serial machining and corresponding assembling machining.

The data analysis and modification algorithm software module is used for analysis of machining path and modification processing according to data from the data exchange between numerical control systems of numerical control machining devices of serial machining and corresponding assembling machining and various machining parameters and status information from the small cloud numerical control system.

The serial processing software module and the parallel processing software module are used for independently processing results of the data analysis and modification algorithm software module to obtain a data format required by serial machining and parallel corresponding assembling machining, first sending to a cooperative machining modification information processing software module of a host subsystem of the small cloud numerical control system to further execute a next job, sending back to the data analysis and modification algorithm software module to perform data exchange with numerical control systems of numerical control machining devices of serial machining and corresponding assembling machining through the remote communication software module.

Figure 2:
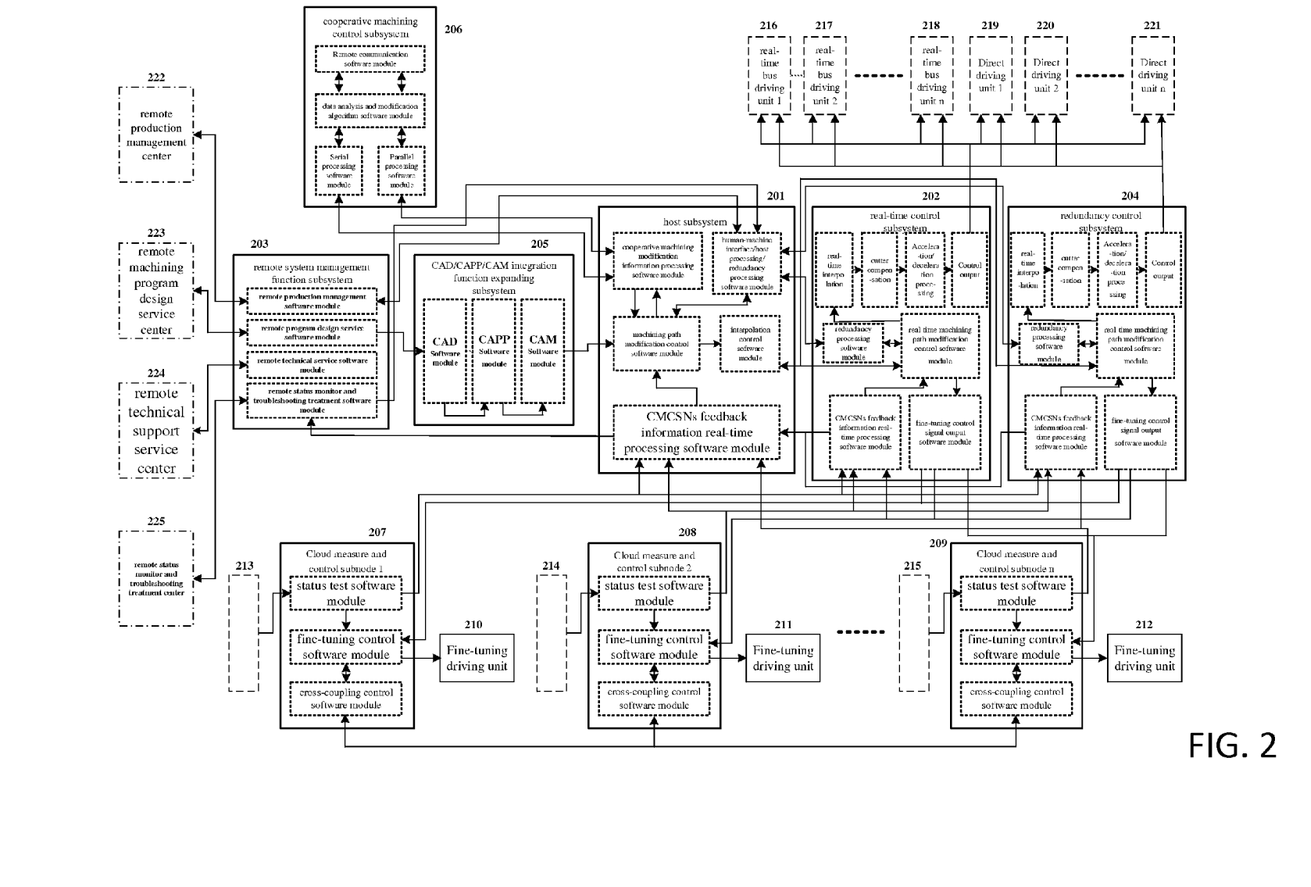
FIG. 2 is a data flowchart of the cloud numerical control system of the invention.

FIG. 2 is a data flowchart of the cloud numerical control system. The operational flow is introduced as follows.

1) After the system has started, subsystems separately perform self-detecting. Troubleshooting will be performed if not OK.

2) A remote system management function subsystem 203 performs remote machining management service treatment, remote system upgrade service treatment and remote numerical control program design service treatment. When the three treatment steps receive a command and treatment request from remote centers (remote production management center 222, remote machining program design service center 223 and remote technical support service center 224), corresponding treatment will be performed and then a remote status monitor and troubleshooting treatment service will be performed and communication with the remote status monitor and troubleshooting treatment service center 225 will be created.

3) The remote production management software module of the remote system management function subsystem 203 will perform treatment according to commands of the remote production management center 222 and send a treatment result to the host subsystem 201.

4) The remote program design service software module of the remote system management function subsystem 203 performs treatment according to commands of the remote machining program design service center 223 and sends a machining program to a CAD/CAPP/CAM integration function expanding subsystem 205. An initial treatment result will be sent to the machining path modification control software module of the host subsystem 201 through treatment of CAD software module, CAPP software module and CAM software module of the subsystem 205.

5) A cooperative machining control subsystem 206 uses its remote communication software module to receive external cooperative machining information, the information is analyzed by the subsystem 206 and disintegrated into serial machining information and parallel cooperative machining information by a modification algorithm software module, then the information is sent to a serial processing software and a parallel processing software module of the subsystem 206 to be processed, and the processing result is sent to a cooperative machining modification information processing software module of the host subsystem 201 to be processed.

6) A human-machine interface/host processing/redundancy processing software module of the host subsystem 201 starts managing and associates the cooperative machining modification information processing software module to send various commands to a machining path control software module. The machining path control software module performs calculation according to a machining program from the CAD/CAPP/CAM integration function expanding subsystem and other information. The calculated machining path information is sent to an interpolation control software module to start a machining control.

7) The interpolation control software module of the host subsystem 201 sends machining path information to a real-time machining path modification control software module of a real-time control subsystem 202. The real-time machining path modification control software module divides the control information into two ways, way 1 and way 2. Way 1 is action control information, which is sent to parts of real-time interpolation, cutter compensation, acceleration/deceleration processing and control output to directly drive real-time bus driving units 216, 217, 218 and direct driving units 219, 220, 221 to perform motion path and assistance tool control. Way 2 is compensation control information, which is sent to a fine-tuning control signal output software module and further sent to CMCSNs 207, 208, 209.

8) The CMCSNs 207-209 start operating. Status test software modules of the CMCSNs 207-209 receive status information from the sensor sets 213-215 to feedback to a CMCSNs feedback information processing software of the host subsystem 201, a CMCSNs feedback information processing software of the real-time control subsystem 202 and a CMCSNs feedback information processing software of the redundancy control subsystem 204. Meanwhile, fine-tuning control software module in the CMCSNs 207-209 receive feedback information of the status test software module and fine-tuning control signals from the fine-tuning control signal output software module in the real-time control subsystem 202 or the redundancy control subsystem 204, and also receive cross-coupling fine-tuning information from a cross-coupling control software module to form fine-tuning control to the FTDUs 210-212.

9) The host subsystem 201, according to status information feedbacked by the CMCSNs 207-209, performs machining path modification treatment though the machining path modification control software module and sends to the real-time control subsystem 202 and the redundancy control subsystem 204 through the interpolation control software module. Then the subsystem 201 sends the feedback information to the cooperative machining modification information processing software module and the serial processing software module and parallel processing software module of the cooperative machining control subsystem 206, the information is analyzed and processed by the modification algorithm software module to be sent to the numerical control system of a cooperative machining device through the remote communication network to implement "interactive cooperative machining". Meanwhile, the feedback information is judged by the human-machine interface/host processing/redundancy processing software module to determine to use the real-time control subsystem 202 or to switch to the redundancy control subsystem 204. Such a switch is performed by sending signals to the real-time control subsystem 202 and the redundancy processing software module of the redundancy control subsystem.

10) The CMCSNs 207-209 send feedback signals of the sensor sets 213-215 acquired by the status test software module and processed by the fine-tuning control software module to cross-coupling control software modules of other CMCSNs through the cross-coupling control software module to complete cross-coupling compensation control processing.

11) The remote status monitor and troubleshooting treatment software module of the remote system management function subsystem 203 receives status information processed by the host subsystem 201 to perform status monitor and troubleshooting treatment, and sends to a remote status monitor and troubleshooting treatment center to be treated.

12) The host subsystem 201, real-time control subsystem 202, redundancy control subsystem 204, remote system management function subsystem 203, cooperative machining control subsystem 206, CMCSNs 207-209 and FTDUs 210-212 parallelly work to implement the overall cloud numerical control function until machining has been finished.

Figure 3:
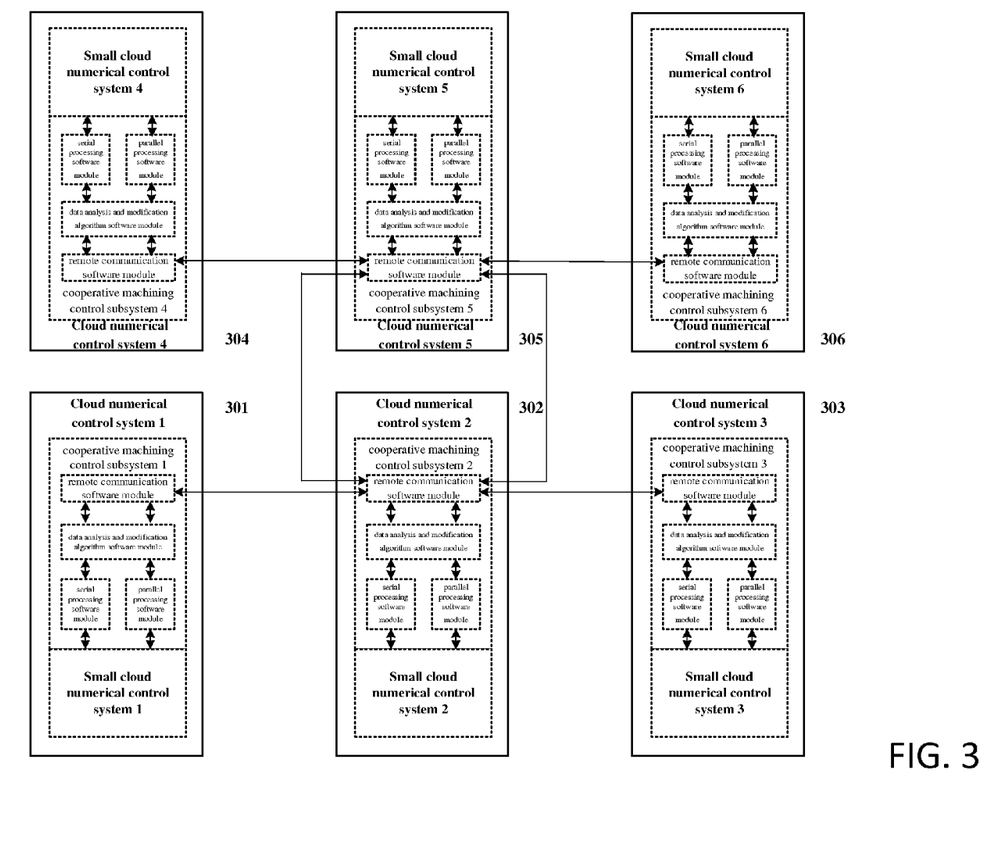
FIG. 3 is a data flowchart of the large cloud numerical control system of the invention.

FIG. 3 is a flowchart of the large cloud numerical control system, in which reference numerals 301-303 stand for cloud numerical control systems equipped in numerical control devices executing serial machining processes for a workpiece, reference numerals 304-306 stand for cloud numerical control systems equipped in numerical control devices executing serial machining processes for another workpiece, and workpieces made by the numerical control machining devices controlled by the systems 302, 305 will be assembled. The detail will be described as follows.

1) Cloud numerical control systems 301, 304 send status parameters and complex machining errors processed by the modification algorithm software module to cloud numerical control systems 302, 305 through their remote communication software modules, then they will be processed by serial processing software module in 302 and 305, and sent to a data analysis and modification algorithm software module to perform serial machining modification.

2) Because workpieces made by the numerical control machining devices controlled by the cloud numerical control systems 302, 305 need to be cooperatively assembled, 302 and 305 need synchronous machining, i.e., in their machining processes, the status parameters obtained from the small cloud numerical control systems are sent to each other to perform parallelly cooperative machining modification processing through their respective data analysis and modification algorithm software modules, and then send them to their respective small cloud numerical control systems.

3) After machining of the cloud numerical control systems 302, 305 has finished, their machining process status parameters and complex machining errors are sent to the cloud numerical control systems 303, 306 to complete serial machining until a final complete workpiece has finished machining.

It will be appreciated by persons skilled in the art that the above embodiment has been described by way of example only and not in any limitative sense, and that various alterations and modifications are possible without departure from the scope of the invention as defined by the appended claims.

What is claimed is:

1. A cloud numerical control system for cooperatively controlling multiple numerical control machining devices, comprising: a first cooperative machining control subsystem (FCMCS), a first cloud control core node (FCCCN), first cloud measurement and control subnodes (FCMCSNs), first fine-tuning driving units (FFTDUs), a first real-time communication network (FRTCN) and a first online internet (FOLI), wherein:

the FCMCS accomplishes functions of interactively cooperative machining between different devices, functions of the FCMCS include acquiring data of a final machining error of a workpiece in a previous machining step and providing the acquired data to the FCCCN, FCMCSNs and FFTDUs to make modification according to an actual machining accuracy, online acquiring various operational status parameters from the FCCCN, FCMCSNs, FFTDUs, FRTCN and FOLI, integrating and analyzing the acquired data to obtain a real-time machining error of the workpiece which is being machined, predicting a sequent machining error, sending the real-time machining error and the predicted sequent machining error to the multiple numerical control machining devices, receiving and analyzing corresponding data from the multiple numerical control machining devices to provide to a cloud numerical control subsystem to make modification, and sending a final error of the workpiece to a cloud numerical control device of a numerical control machining device in a next machining step to optimize the next machining step after the workpiece has been machined, the cloud numerical control subsystem is installed in a single device and includes a second cloud control core node (SCCCN), second cloud measurement and control subnodes (SCMCSNs), second fine-tuning driving units (SFTDUs), a second real-time communication network (SRTCN) and a second online internet (SOLI);

the FCCCN performs a human-machine operation and host function, performs signal processing, combination control and operation of complex control algorithm and control command outputs, remote communication and cooperative management operation functions, the FCCCN includes a first PC (personal computer) subsystem, a second PC (personal computer) subsystem, a third PC (personal computer) subsystem and a fourth PC (personal computer) subsystem, the first, second, third and fourth PC subsystems perform a host function, a real-time control function, a remote communication management function and a redundancy control function, respectively;

the FCMCSNs perform detection of operation status signals of components and generation of fine-tuning control signals, accept adjustment, management and control commands from the FCCCN, a part of the FCMCSNs associate with the FCCCN to perform a real-time control function according to actual requirements, transferring of an operation status data is provided between the FCMCSNs to implement a connection and an interactively cooperative measurement and control function;

the FFTDUs accept commands of the FCMCSNs to separately perform fine-tuning control operation to inside components of numerical control machining devices;

the FRTCN performs online data transfer in the FCCCN, between the FCCCN and the FCMCSNs and between the FCMCSNs; and the FOLI performs communication between the FCCCN and an external device.

2. The cloud numerical control system of claim 1, wherein the FCMCS adopts an independent industrial PC system whose software module includes a remote communication software module, a data analysis and modification algorithm software module, a serial processing software module and a parallel processing software module, the remote communication software module is used for data exchange between numerical control systems of numerical control machining devices of serial machining and corresponding assembling machining, the data analysis and modification algorithm software module is used for analysis of machining track and modification processing according to data from the data exchange between numerical control systems of numerical control machining devices of serial machining and corresponding assembling machining and various machining parameters and status information from the FCCCN, the FCMCSNs, the FFTDUs, the FRTCN and the FOLI, the serial processing software module and the parallel processing software module are used for independently processing results of the data analysis and modification algorithm software module to obtain a data format required by serial machining and parallel corresponding assembling machining, first sending to a cooperative corresponding machining modification information processing software module of a host subsystem of the FCCCN to further execute a next job, sending back to the data analysis and modification algorithm software module to perform data exchange with numerical control systems of numerical control machining devices of serial machining and corresponding assembling machining through the remote communication software module.

3. The cloud numerical control system of claim 1, wherein the first PC subsystem includes a human-machine interface/host processing/redundancy processing software module, a cooperative corresponding machining modification information processing software module, a machining track modification control software module, an interpolation control software module and a cloud measurement and control subnode feedback information processing software module, the first PC subsystem is an executor of a primary process of parallel processing of the FCCCN and performs parallel processing and data exchange with the other PC subsystems;

the second PC subsystem includes a real-time machining track modification control software module, a cloud measurement and control subnode feedback information real-time processing software module, a fine-tuning control signal output software module, a real-time interpolation, cutter compensation, acceleration/retardation processing, control output software and redundancy processing software module, the second PC subsystem is under control and management of the first PC subsystem;

the third PC subsystem includes a remote production management software module, a remote program design service software module, a remote technical service software module and a remote status monitor and troubleshooting treatment software module to perform remote production management, remote status monitor, troubleshooting treatment, remote program design and remote technical support and technical upgrade; and the fourth PC subsystem includes a real-time machining track modification control software module, a cloud measurement and control subnode feedback information real-time processing software module, a fine-tuning control signal output software module, a real-time interpolation, knife compensation, acceleration/retardation processing, control output software and redundancy processing software module, the fourth PC subsystem is a redundant system of the second PC subsystem for replacing the second PC, subsystem through management of the first PC subsystem to avoid machining discontinuation.

4. The cloud numerical control system of claim 2, wherein the FCCCN further comprises an expandable fifth PC subsystem, the fifth PC subsystem includes a CAD (computer aided design) software module, a CAPP (computer aided process plan) software module and a CAM (computer aided manufacturing) software for implementing integration of CAD, CAPP, CAM and CNC (computer numerical control).

5. The cloud numerical control system of claim 3, wherein the FCMCSNs further comprises a core controller and I/O modules with a function of independent measurement and control, the core controller possesses functions of acquiring detection signals from the I/O modules, retrieving compensation signals through signal processing and data integration processing, accepting feedback signals from other FCMC-SNs to further process, sending a processed result to the FCCCN through a real-time bus communication, and accepting a fine-tuning command from the FCCCN to process into a control command to a fine-tuning driving unit in a local numerical control machining device; each I/O module online acquires signals from sensors, sends the signal to the core controller and accepts control commands of the core controller to send control output signals to the FFTDUs, the FCMCSNs exchange status information data to each other according to substantial connective relations and performs an independent modification control in the FCMCSNs according to relative positions of each other and requirements of revised control, such a modification control is performed by sending commands to the FFTDUs, and fine-tuning status information is fed back to the FCCCN and other related FCMCSNs for serving as feedback information of further modification.

* * * * *